United States Patent [19]

Sept, Sr.

[11] 4,079,769
[45] Mar. 21, 1978

[54] APPARATUS FOR MOUNTING AND DISMOUNTING OFF-HIGHWAY TIRES

[76] Inventor: Donald D. Sept, Sr., Box 421, Star Rte., St. Regis, Mont. 59866

[21] Appl. No.: 739,962

[22] Filed: Nov. 8, 1976

[51] Int. Cl.² .............................................. B60C 25/06
[52] U.S. Cl. .................................................. 157/1.26
[58] Field of Search ............................... 157/1.2, 1.26

[56] References Cited

U.S. PATENT DOCUMENTS

| | | | |
|---|---|---|---|
| 2,512,864 | 6/1950 | Koester | 157/1.2 |
| 2,568,874 | 9/1951 | Vanleirsberghe | 157/1.26 |
| 2,792,878 | 5/1957 | Sanford | 157/1.2 |
| 3,156,289 | 11/1964 | Dragoo et al. | 157/1.2 |
| 3,276,504 | 10/1966 | Duquesne | 157/1.2 |
| 3,853,165 | 12/1974 | Collmann | 157/1.2 |

FOREIGN PATENT DOCUMENTS

| | | | |
|---|---|---|---|
| 339,460 | 4/1936 | Italy | 157/1.2 |
| 547,995 | 9/1956 | Italy | 157/1.2 |
| 610,921 | 10/1960 | Italy | 157/1.2 |

*Primary Examiner*—James L. Jones, Jr.
*Assistant Examiner*—James G. Smith
*Attorney, Agent, or Firm*—Berman, Aisenberg & Platt

[57] ABSTRACT

Apparatus which permits one individual to mount and dismount large, off-highway tires onto and off of their respective rims. The present invention is particularly designed to facilitate the mounting of such tires in a more safe, efficient, and far less laborious manner than heretofore possible. This is accomplished by the provision of apparatus which exerts great pressure on the sidewall of the tire being mounted so as to uniformly depress same to enable easy insertion of the lock ring about the tire rim. A preferred embodiment includes a pair of hydraulically operated jacks for exerting the pressure, and a rigid bar linkage interconnecting the moveable pistons of the jacks with the rigid rim structure to provide relative movement between the tire and the rim. The rigid bar linkages preferably includes means which allow the apparatus to be adapted to a plurality of differently sized tires and rims.

14 Claims, 15 Drawing Figures

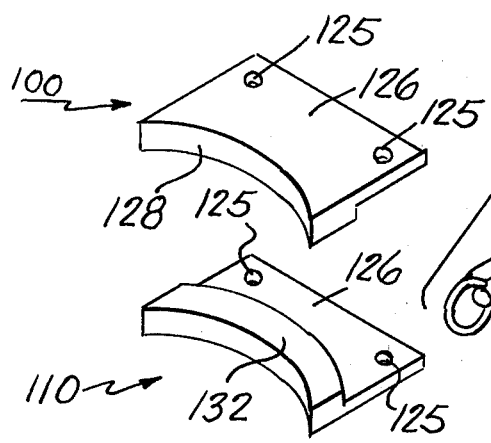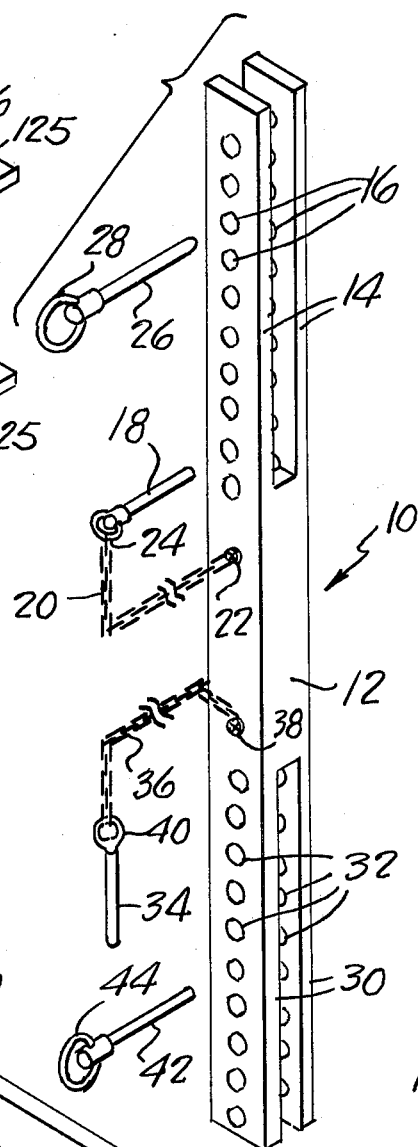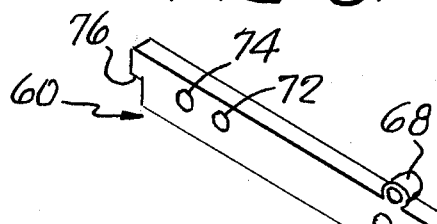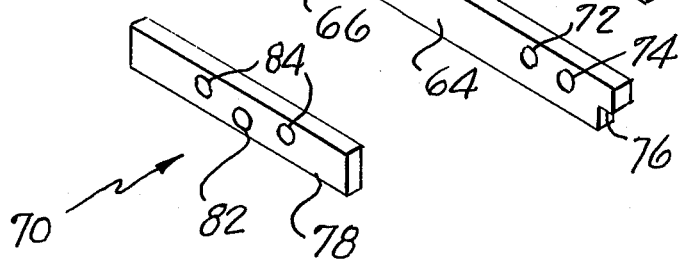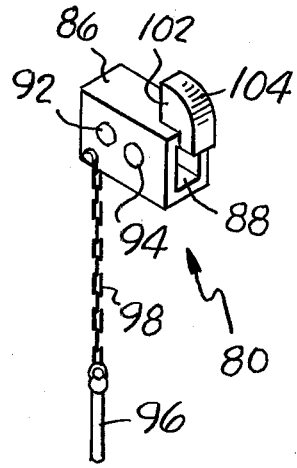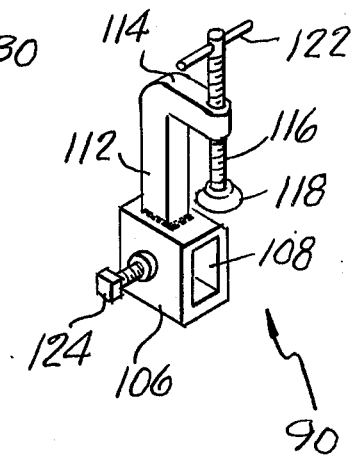

APPARATUS FOR MOUNTING AND DISMOUNTING OFF-HIGHWAY TIRES

BACKGROUND OF THE INVENTION

1. Field of the Invention

The present invention is related to tire mounting and dismounting devices and, more particularly, is directed towards apparatus for mounting and dismounting off-highway tires onto and off of their respective rims.

2. Description of the Prior Art

Tires and rims are maufactured in many different sizes for utilization with many different types of vehicles. The larger the size of the tire, the more difficult it becomes for a single individual to safely mount and dismount the tire to or from its associated rim.

For extremely large industrial tires, those which, for example, are mounted on 51 inch and larger rims, heavy expensive equipment and a multitude of personnel are required in order to safely complete a mounting or dismounting operation.

For those off-highway tires in the 15 to 25 inch diameter range, such as are commonly utilized for tractors, heavy trucks, construction vehicles, and mining vehicles, mounting and dismounting at on-site or remote areas must often be accomplished without the benefit of fancy equipment.

An exemplary technique for manually mounting such tires is described in the Goodyear Off-Highway Rims catalog No. TR71-6056R, at page 65. In the technique therein described, the tire is initially placed about the rim base while lying on its side. The side flange is then placed over the rim base and is manually pushed straight down as far as possible. The instructions then require the installer to actually stand on the side flange to force it below both grooves in the rim base. With the side flange and the installer thus positioned, the snap lock ring must then be manually inserted into the outer lock ring groove in the rim base. After the snap lock ring is in place in the case of tubeless tires (no easy task), a rubber sealing ring must then be placed in the lower sealing ring groove, an operation which also requires the flange to be held down below the groove exposure by having the installer stand on the tire's sidewall and-/or flange. After ensuring, insofar as possible, that the lock ring fits snugly against the rim base around the entire circumference of the rim, the tire is then inflated by the installer. Upon inflation, the side flange will rise over the sealing ring and out against the lock ring.

The Goodyear catalog cautions that the lock ring must be properly seated before the tire is inflated. Otherwise, upon inflation, the lock ring may snap loose off the rim, and may cause serious injury, even death, to the installer. From this point of view, the manual procedure leaves much to be desired in terms of the degree of safety afforded to the installer. Many serious accidents have occurred as a result of inadvertent improper seating of the lock ring prior to inflation.

Further, when one attempts to follow such instructions to manually mount tires in the 24 to 25 inch diameter catagory, which are common on many large pieces of earth moving machinery, one generally faces many strenuous hours of back breaking labor in attempting to manually hold down the side flange and side wall of the tire while installing the split lock ring and sealing ring. It often requires two and perhaps three individuals to facilitate installation.

There are, unfortunately, no tools presently available which permit one person to more safely and easily mount such large off-highway tires.

Although it is common, in fact it is necessary, when mounting extremely large (51 inch diameter and larger) tires to employ large pieces of hydraulic equipment (as described on pages 70 and 71 of said Goodyear catalog), use of such equipment and personnel is highly impractical in remote locations where one frequently finds the necessity for mounting and/or dismounting the intermediate, but nevertheless large, sized tires (15 to 25 inches in diameter). It is simply too impractical and costly to ship such tires and rims back to a central garage or tire handling facility where the large equipment might be available.

It may therefore be appreciated that a great need exists for a versatile and safe tool which permits a single individual to on-site mount and dismount large diameter off-highway tires onto and off of their associated rims.

Prior art United States patents which illustrate exemplary tire handling devices in this general art area of which I am aware include: U.S. Pat. Nos. 1,530,265; 2,960,153; 3,574,318; 3,743,000; 3,857,431; and 3,942,575. However, none of the devices described in the cited patents come close to suggesting the invention concept to be detailed hereinbelow.

OBJECTS AND SUMMARY OF THE INVENTION

It is therefore a primary object of the present invention to provide an apparatus which permits a single individual to mount and dismount large, off-highway tires onto and off of their associated rims which overcomes all of the disadvantages noted above with respect to prior art techniques.

Another object of the present invention is to provide apparatus for mounting and dismounting large off-highway tires which may be safely utilized by a single individual, and which is simple in construction and is therefore durable and amenable to inexpensive manufacture and production.

A further object of the present invention is to provide apparatus for mounting and dismounting large, off-highway tires which is extremely versatile in enabling a wide range of tire and rim sizes to be accommodated.

A still further object of the present invention is to provide a novel and unique apparatus for permitting one person to mount large off-highway tires onto their associated rims in a manner which minimizes the risks of injury while still permitting simple, quick, and easy installation.

An additional object of the present invention is to provide apparatus which may be adapted for mounting or dismounting a large tire to or from its associated rim, which obviates the prior art necessity of requiring several individuals to unite in a back breaking manual effort in an attempt to properly seat the rim parts prior to inflation.

A still additional object of the present invention is to provide a large tire mounting device which is portable and therefore may be easily transported to and utilized in remote areas.

Another object of this invention is to provide an apparatus which is chiefly intended to facilitate the mounting of large tires to their rims, but which also may be utilized in a demounting procedure, and is especially useful in such demounting procedures where rust scale has accumulated on the rim parts to impede ordinary breaking down of the tire by conventional implements.

Another object of this invention is to provide a tool which may be constructed from conventional, readily available components, which is durable, has no moving parts, and which therefore will last indefinitely.

The foregoing and other ojbects are attained in accordance with one aspect of the present invention through provision of apparatus which may be adapted for mounting or dismounting a large tire to or from its associated rim, which comprises means for exerting pressure at two locations on the sidewall of the tire, and means for coupling the pressure exerting means to the tire rim. The two locations are preferably substantially diametrically opposed on the tire sidewall, the pressure exerting means preferably comprising two manually actuable hydraulic jacks. The coupling means more particularly comprises first means which extends between two opposed positions on the inner portion of the tire rims, second means extending across the two locations on the tire sidewall, and vertically oriented means for rigidly coupling the first and second means together.

In accordance with more specific aspects of the present invention, the first named means comprises a first rigid bar positioned transversely with respect to the vertically oriented means. The last-named means preferably includes means positioned near the lower end thereof for adjustably accommodating the height of the first rigid bar coupled thereto. The height adjusting means comprises a pair of substantially parallel downwardly depending flanges which have a plurality of spaced apertures formed therethrough for cooperating with a central aperture formed through the first rigid bar. A pin is provided for insertion through the central aperture and the selected apertures to rigidly connect the first bar with the vertically oriented means. A safety pin is also preferably provided which is inserted through a second set of apertures in the downwardly depending flanges, the second set of apertures being preferably located just below and adjacent to the apertures through which the first or primary pin has been inserted.

In accordance with other aspects of the present invention, means may be coupled to the ends of the first rigid bar for securing same to the inner periphery of the tire rim, the securing means comprising a pair of rigid hollow members which include means for fixedly securing same to the ends of the first rigid bar. In one embodiment, for use with a particular style of rim, each of the rigid hollow members has a wedge means which abuts the inner periphery of the rim, while in an alternative embodiment, each of the rigid hollow members includes means for clamping same to an inwardly extending flange on the rim.

In accordance with other aspects of the present invention, the second-named means comprises a second rigid bar which is also positioned transversely with respect to the vertically oriented means but across the top portion thereof. A height adjusting means is also provided at the top portion of the vertically oriented means, and preferably comprises a pair of substantially parallel upwardly extending flanges also having a plurality of spaced apertures formed therethrough. The second rigid bar includes a central aperture formed therethrough which is aligned with selected apertures in the upwardly extending flanges for coupling therewith via a primary coupling pin. A safety pin is also provided at the upper portion of the vertically oriented means for insertion through a second set of apertures which are preferably positioned just above and adjacent to those apertures through which the first or primary pin extends.

In accordance with other aspects of the present invention, the second rigid bar also includes means positioned at both ends thereof for operatively coupling same to the hydraulically actuable jacks which preferably include vertically extendible pistons. In a preferred embodiment, the operative coupling means comprises ring means positioned on the underside of the second bar for receivably retaining the upper ends of the pistons. Preferably, a plurality of rings are positioned at spaced corresponding locations on the ends of the second rigid bar whereby tires of a different diameter may be accommodated by the tool.

In accordance with still other aspects of the present invention, a pair of base plates may also be provided which are positioned respectively between the base of the two jacks and the two locations on the tire sidewall where the downward pressure is to be exerted. Each of the base plates preferably include an arcuate edge in juxtaposition to the rim flange for permitting selective engagement thereby during operation.

BRIEF DESCRIPTION OF THE DRAWINGS

Various objects, features and attendant advantages of the present invention will be more fully appreciated as the same becomes better understood from the following detailed description thereof when considered in connection with the accompanying drawings, in which:

FIGS. 6 and 7 respectively illustrate preferred embodiments of the right and left jack support members, respectively, of the present invention;

FIG. 8 is a perspective view of the main or center post assembly along wit associated components in accordance with the present invention;

FIG. 9 is a perspective view illustrating a preferred embodiment of the lower transverse bar of the present invention;

FIG. 10 is a perspective view illustrating yet another embodiment of a lower transverse bar in accordance with the teachings of the present invention;

FIG. 11 is a perspective view of a preferred embodiment of a rim-engaging member in accordance with the present invention;

FIG. 12 is a perspective view which illustrates an alternative rim-engaging member;

DETAILED DESCRIPTION OF THE PREFERRED EMBODIMENTS

Figure 1:
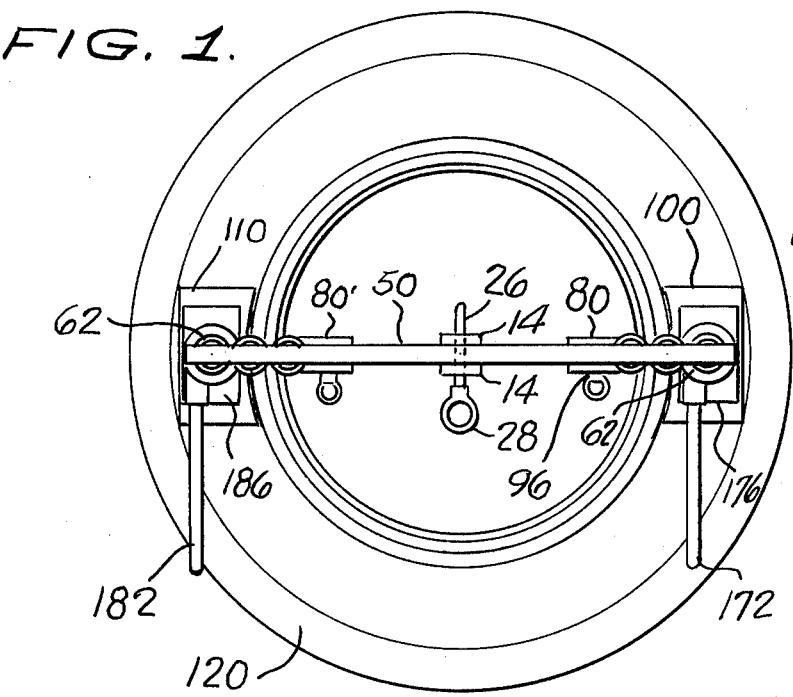
FIG. 1 is a top view which illustrates a preferred embodiment of the present invention properly positioned with respect to a tire and rim which is to be mounted thereby.

Referring now to the drawings, wherein like reference numerals represent identical or corresponding parts throughout the several views, and more particularly to FIGS. 5 through 12 thereof, there are illustrated in perspective views the main components which comprise a preferred embodiment of the present invention utilized for mounting and dismounting large, off-highway tires onto and off of their respective rims.

Referring first to FIG. 8, there is illustrated a perspective view of the main or center vertically oriented post which is indicated generally by reference numeral 10. The preferred construction of post 10 includes a solid central support portion 12 from which upwardly extends a pair of parallel flanges 14 which are intended to accommodate an upper transverse bar, as will become more clear hereinafter. The flanges 14 have formed therein a plurality of height adjusting apertures 16 at regular spaced locations. Preferably, ten such apertures are provided along the upper support flanges 14 as illustrated.

A primary or upper bar positioning pin 18 is connected to the main body portion 12 of center post 10 via a flexible chain 20. Chain 20 is connected between a ring or like member 24 on the end of pin 18 and a point of attachment 22 on body 12, which may comprise a weld joint. An upper safety pin 26 is also provided which preferably includes a ring handle 28 for easy manipulation thereof. Pins 18 and 26 are inserted through certain of the apertures 16 formed in flanges 14 in a manner which will be described in more detail hereinafter.

Extending downwardly from the solid central support portion 12 of center post 10 are a similar pair of parallel support flanges 30 having a plurality, preferably ten, of height-adjusting apertures 32 formed therethrough. A pimary lower bar positioning pin 34 is connected to body 12 via a chain 36 which extends between a weld point 38 and a ring 40 formed on the end of pin 34. A lower safety pin 42 may also be provided, pin 42 having a ring handle 44, or the like.

Figure 5:
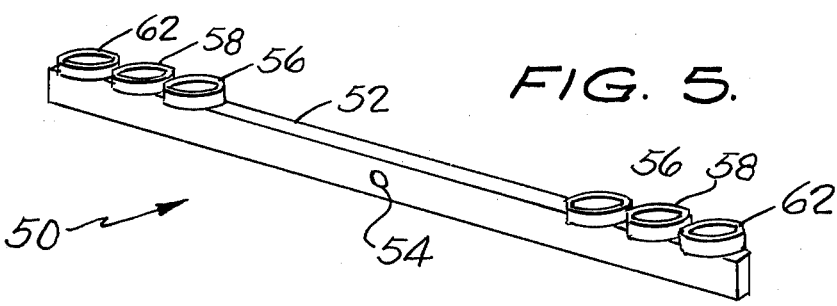
FIG. 5 illustrates a preferred embodiment of the upper transverse jack-holding bar of the present invention.

Referring now to FIG. 5, reference numeral 50 indicates generally a preferred embodiment of an upper transverse jack holding member. Jack holding member 50 comprises more particularly a rigid bar 52 having a central through aperture 54 which may be aligned upon installation with a pair of coaxial apertures 16 extending through flanges 14 of post 10 (FIG. 8). Bar 52 has formed on the lower surface thereof a plurality of pairs of jack support members in the form of rings 56, 58 and 62. Ring pairs 56, 58 and 62 are provided so as to accommodate tires of varying diameters in a manner to become more clear hereinafter.

Referring now to FIG. 9, another component of the preferred embodiment of the present invention is illustrated and comprises a lower transverse bar indicated generally by the reference numeral 60. Bar 60 comprises a rigid bar or rod 64 having a central through aperture 66 for mounting same to flanges 30. A small stabilizer pipe 68 is preferably welded to the upper surface of bar 60, pipe 68 having an aperture extending therethrough to assist in the assembly procedure of the present invention, to be described in more detail below. On the ends of bar 64 are provided inner and outer pairs of mounting apertures 72 and 74, respectively, which accommodate either the rim-engaging members 80 of FIG. 11 or the rim-engaging members 90 of FIG. 12, as the size and/or design of the particular rim may dictate. In a preferred construction, inner mounting apertures 72 are designed to be accommodated within a 24 inch diameter rim, while mounting aperture pairs 74 are utilized when the tool is assembled on a 25 inch diameter rim. The ends 76 of bar 60 are notched as indicated.

FIG. 10 indicates by reference numeral 70 an alternative construction of a lower transverse bar which may be utilized on smaller sized rims than the transverse bar 60 of FIG. 9. More particularly, the alternate construction 70 comprises a rigid rod 78 which is shorter in length than rod 64 of FIG. 9. Rod 78 includes a centrally formed through aperture 82 for mounting same to the apertures 32 formed in flanges 30 of post 10. At the respective sides of aperture 82 are formed another pair of apertures 84 to accommodate the rim engaging members 80 of FIG. 11. The lower transverse bar 70 is generally utilized in conjunction with rim diameters of 15 inches or so, as is illustrated in greater detail in FIGS. 13 and 14 to be explained hereinbelow.

Figure 2:
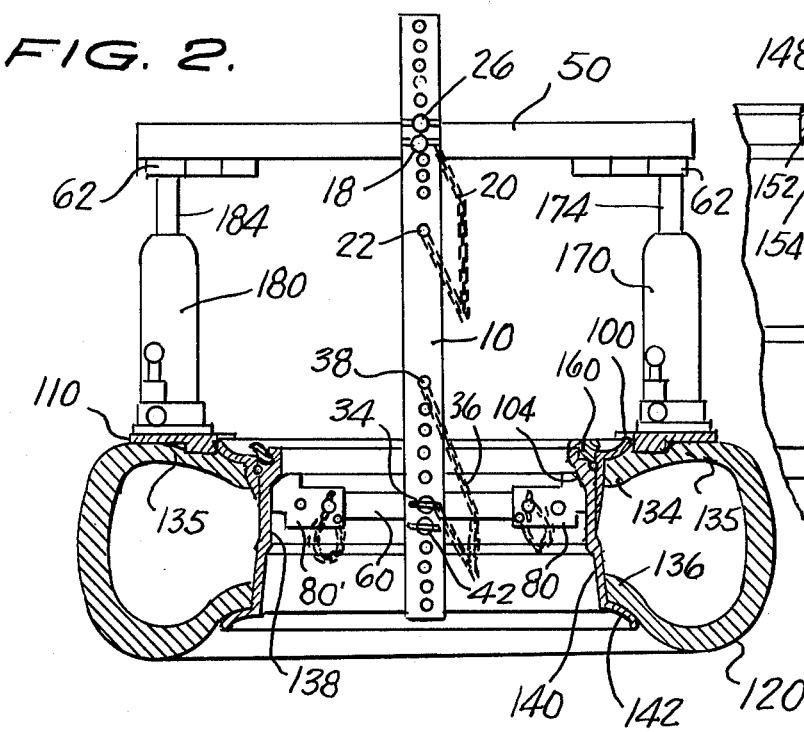
FIG. 2 is a side view, partly in section, illustrating the various components of the preferred embodiment illustrated in FIG. 1.

Referring now to FIG. 11, reference numeral 80 indicates generally a first embodiment of a rim-engaging member. Member 80 is formed of a rectangular hollow body 86 forming a longitudinal slot 88 therethrough to permit mounting onto the ends of rods 60 or 70. Positioned in the side walls of rim-engaging member 80 are two pairs of mounting holes 92 and 94 for permitting adjustable mounting of member 80 on the inner and outer apertures 72 or 74 of bar 60, or the apertures 84 of bar 70. A mounting pin 96 is preferably permanently attached to member 80 via a flexible chain 98. The upper surface of body 86 includes on the right edge thereof a wedge 102 having an arcuate rim-engaging surface 104 formed thereon. It should be understood that while FIG. 11 illustrates only one rim-engaging member 80, a complementary, second member 80' (as illustrated in FIG. 2) is also provided with the apparatus of the present invention, complementary member 80' being a mirror image of rim-engaging member 80 illustrated in FIG. 11.

Figure 15:
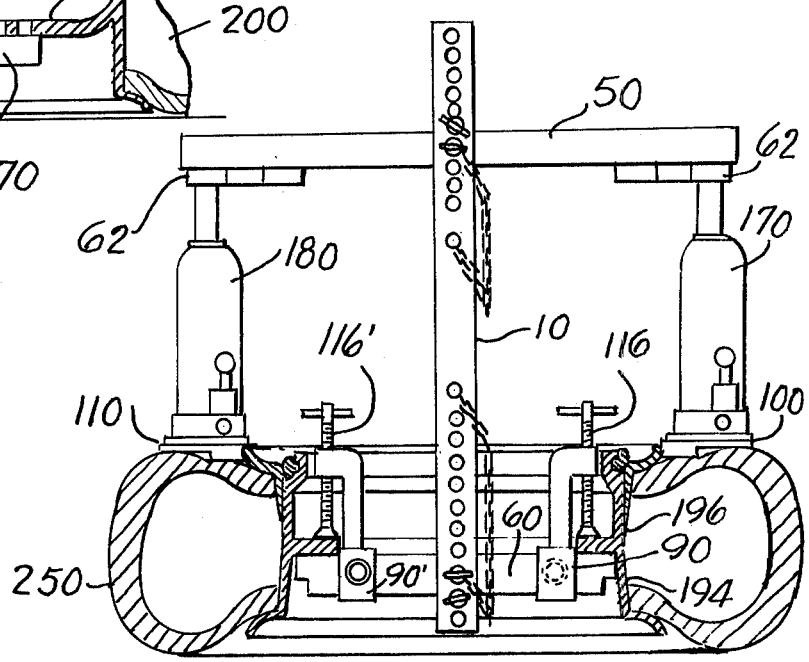
FIG. 15 is a side view, partly in section, which illustrates yet another alternative component set up in accordance with the teachings of the present invention.

FIG. 12 illustrates another and alternative embodiment of a rim-engaging member 90 which is utilized in connection with tire rims having inwardly extending flanges, as is illustrated in FIG. 15, for example. Rim-engaging member 90 comprises a rectangular hollow body 106 which forms a longitudinal bar-mounting slot 108 therethrough. A vertical support post 112 extends from the upper surface of body 106, a horizontal supporting flange 114 extending from vertical post 112. Flange 114 has formed in the free end thereof a threaded clamping member 116 which has a rim-engaging cup 118 formed at the lower end thereof and a transversely positioned handle 122 for easy turning thereof positioned through its upper end. Finally, body 106 of member 90 includes a set screw 124 formed in a side wall thereof for securing same to one of the apertures 72 or 74 of bar 60. As with the above-described member 80, member 90 is provided in pairs, the complementary pair 90' being illustrated in FIG. 15.

FIGS. 6 and 7 illustrate a pair of right and left jack support members indicated generally by reference numerals 100 and 110, respectively. Jack support members 100 and 110 ae symmetrical with respect to one another in construction, and each include a substantially planar jack-supporting plate 126 upon which the bases of the hydraulic jack members are placed. Each plate 126 terminates in an arcuate edge 128 that approximates the curvature of the rim or rim flange adjacent to which the support members 100 and 110 are placed in use. Arcuate edges 128 are also formed by an increased thickness reinforced rim-engaging peripheral portion 132 which functions as a leveling means for the jacks, in a manner to become more clear hereinafter. Each plate 126 also includes a pair of apertures 125 formed at its corners.

Referring now to FIGS. 1 through 4, the utilization of the apparatus of the present invention will now be explained in conjunction with a conventional large diameter tire 120 which may, for example, be of a 24 inch diameter. Tire 120, shown in cross-section in FIGS. 2 through 4, includes an upper bead 134 and a lower bead 136. The rim assembly onto which the tire 120 is to be mounted comprises an annular rim base 138 having a lower bead seat 140 which terminates in a lower outwardly exending flange 142. Lower bead 136 of tire 120 fits in lower bead seat 140 as illustrated clearly in FIGS. 3 and 4.

Figure 3:
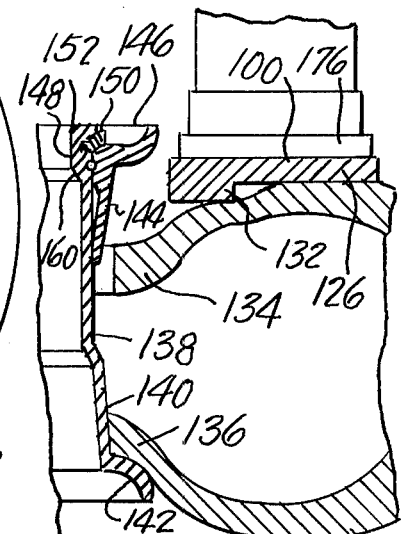
FIG. 3 is an enlarged sectional view of a portion of the apparatus illustrated in FIG. 2 shown in one operative mode.
Figure 4:
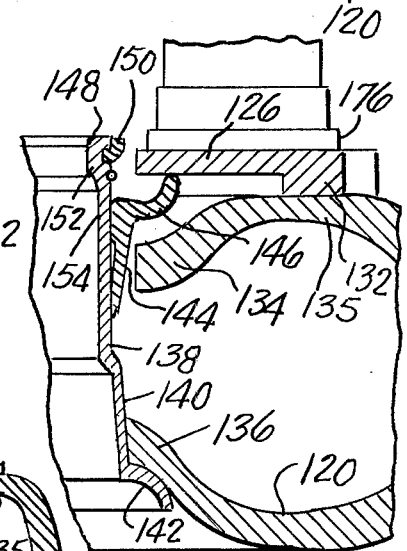
FIG. 4 is a view similar to that illustrated in FIG. 3 but showing an alternative mode of operation thereof.

The upper portion of rim base 138 terminates in a mounting bevel 148 which has a groove 152 formed about the outer periphery thereof for receiving a split lock ring 150, generally formed of spring steel, and illustrated in FIGS. 2 through 4 in its installed position. Connecting the rim base 138 and mounting bevel 148 is an inwardly extending tapered portion 160 (FIG. 3) which serves to seat the rim-engaging member 80 of FIG. 11 in the operational set up illustrated in FIG. 2, for example.

Provided about the mounting bevel 148 of the upper portion of rim base 138 is an upper tapered bead seat band 144 which terminates in an upper side flange 146. Finally, a sealing ring 154 is illustrated in its installed position between the upper bead seat band 144 and the rim 138.

The apparatus of the present invention is adapted for use in combination with a pair of hydraulic jacks 170 and 180 having respective handles 172 and 182 for manual actuation thereof. Jacks 170 and 180 each include a vertically actuable piston 174 and 184, respectively, extending upwardly from the top portions thereof. Pistons 174 and 184 mate with properly positioned jack support members 62 mounted on the underside of upper transverse jack holding member 50.

In operation, when it is desired to utilize the apparatus of the present invention to assist in the mounting of tire 120 onto its rim 138, first the particular diameter of the tire 120 and associated rim is determined and the appropriate lower transverse bar 60 or 70 is chosen. Assuming, for example, that tire 120 is a 24 inch diameter tire having the rim assembly construction indicated in FIGS. 2, 3 and 4, the longer lower transverse bar 60 of FIG. 9 will be selected. Further, since the rim assembly 138 of FIG. 2 has no center flange, the rim-engaging member 80 of FIG. 11 is selected for use, instead of the member 90 of FIG. 12.

After the deflated tire 120 has been placed about its rim base 138, and bead seat band 144 has been positioned between the upper bead 134 of tire 120 and rim base 138, jack support plates 100 and 110 are placed at substantially diametrically opposed positions on the peripheral sidewall of tire 120 as indicated clearly in FIG. 1, and jacks 170 and 180 are placed such that their bases 176 and 186 rest squarely upon jack support plates 100 and 110, respectively. Plates 100 amd 110 may be positioned either adjacent to or on top of bead seat band 144, as indicated respectively in FIGS. 3 and 4, as size and other considerations may dictate.

The rim-engaging members 80 and 80' are then fastened to the respective ends of bar 60 by inserting their pins 96 into their respective inner apertures 92 and 72 as illustrated. With bar 60 positioned within rim base 138, post 10 is placed in its vertical position such that flanges 30 encompass bar 60. The primary lower pin 34 is then positioned through the desired apertures 32 and 66 in flanges 30 and bar 60, respectively, to secure same together. The safety pin 42 is then inserted in the set of apertures immediately below those through which pin 34 has been inserted.

The upper horizontal transverse jack holding member 50 is then inserted between the upper flanges 14 of vertical post 10. Primary pin 18 is then inserted through aligned apertures 16 and 54 at the height at about which members 62 of bar 50 intercept the pistons 174 and 184 of jacks 170 and 180, respectively. Safety pin 26 is then inserted in the set of apertures immediately above that through which pin 18 has been inserted. This serves as an additional precaution to prevent upward movement of the assembly should pin 18 become dislodged.

With the set up illustrated in FIG. 2, the arcuate surface 104 of member 80 engages the inwardly tapered portion 160 of rim base 138 so as to form a solid wedge against upward movement of lower transverse bar 60. Rim-engaging member 80' is similarly wedged against portion 160 of rim 138 on the opposite end of bar 60 as illustrated.

When all of the components have been thus assembled, and it is desired to install the split lock ring 150 in its groove 152 formed in mounting bevel 148, it is necessary to exert an appreciable downward force on the respective plates 100 and 110 in order to compress the upper sidewall of the tire 120 in the fashion illustrated in FIG. 4. When pressure is applied to the plates 126, small portions of the adjacent tire sidewall will protrude into apertures 125 to act as slip-resistant means for the plates 100 and 110. Application of such a force at two diametrically opposed locations on the sidewall 135 of the tire 120 will act, I have found, to uformly lower the sidewall 135 of tire 120, as well as, if desired, flange 146 of bead seat band 144, in such a fashion so as to effortlessly by held below the groove 152 formed in mounting bevel 148 which permits relatively easy installation of split lock ring 150 if groove 152.

In order to compress sidewall 135 and/or bead seat band 144, the handles 172 and 182 of jacks 170 and 180 are substantially simultaneously actuated from the position shown in FIG. 2 so as to extend their pistons 174 and 184 upwardly. This, in turn, creates a downward force at the bases 176 and 178 of the jacks so as to compress the upper sidewall 135 in substantially the fashion illustrated in FIGS. 3 or 4. In FIG. 3, plate 100 is positioned such that all of the pressure exerted by base 176 is applied to the side wall 135 to force same downwardly, while in FIG. 4, the plate 126 is positioned in the reverse fashion to that illustrated in FIG. 3 so as to intercept the flange 146 of bead seat band 144 to force the latter downwardly along with the sidewall 135 of tire 120. This further facilitates the insertion of split lock ring 150 into groove 152.

The assembly of the present invention clearly provides safety features heretofore unavailable. With the set up illustrated in FIG. 2, even if the split lock ring 150 were to become unseated from its groove 152, as may occur, for example, during subsequent inflation of tire 120, transverse bar 50 would remain in place so as to act as a barrier against any upward travel of ring 150, whereby serious injury may be prevented. The apparatus of the present invention is preferably therefore left in place while the tire is being inflated, jacks 170 and 180 being released to permit the air pressure to inflate the tire. Furthermore, by having the jacks 170 and 180 diametrically opposed, and by having them apply substantially equal pressure onto the upper sidewall 135, the bead seat band 144 will be lowered substantially uniformly about the periphery of the rim so as to ensure uniform seating when the tire is inflated and to prevent binding. It is clear that a single individual may operate the device of the present invention to easily and safely install large, off-highway tires onto their associated rims without fear of injury and without requiring hours of manual back breaking labor previously found necessary.

Figure 13:
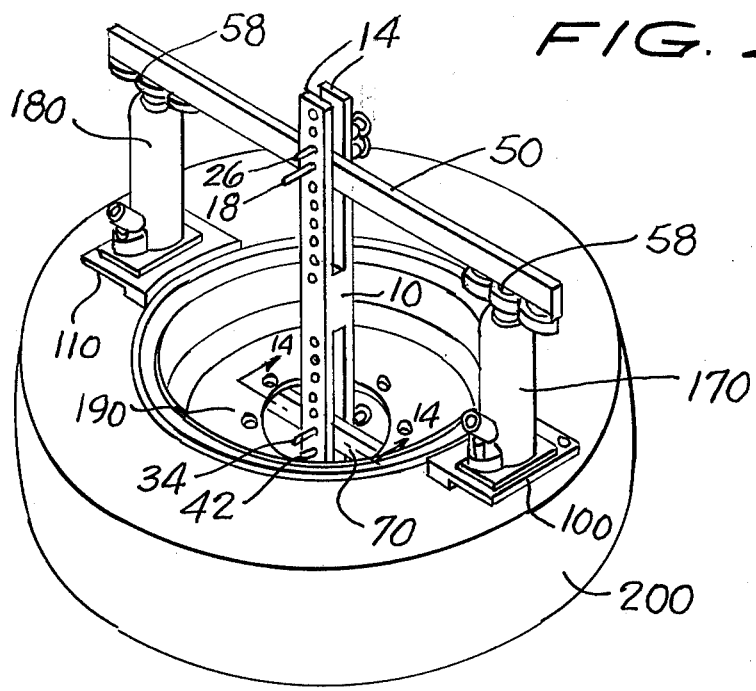
FIG. 13 is a perspective view illustrating an alternative component set up of the present invention, which is similar to the set up illustrated in FIGS. 1 through 4 but applied to a differently sized tire and rim.
Figure 14:
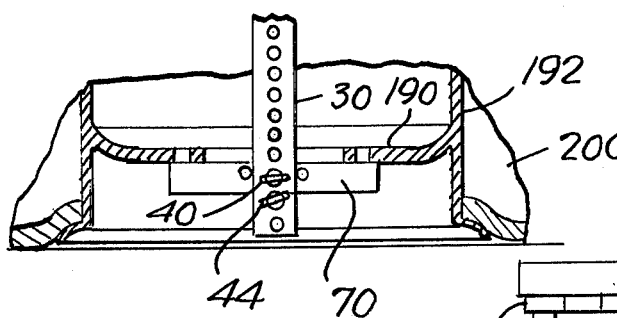
FIG. 14 is a cross-sectional view of certain of the components illustrated in FIG. 13 and taken along line 14—14 thereof.

Attention is now direction to FIG. 13, which illustrates a differently sized tire 200 which, for example, may comprise a 15 inch diameter tire. In this embodiment, the smaller lower transverse bar 70 is placed in vertical post 10 as illustrated. This particular rim assembly includes a rim flange 190 that extends inwardly from the rim base 192. As clearly illustrated in FIG. 14, the lower bar 70 need merely be placed underneath the inwardly extending flange 190 so as to provide the required upward resistance to the downward froces generated by jacks 170 and 180, without the need for either of the rim-engaging devices 80 or 90.

With reference to FIG. 15, reference numeral 250 indicates one of the larger 25 inch tires with which the present invention may be utilized. For this embodiment, due to the provision of an inwardly extending rim flange 196 from rim base 194, the clamp members 90 of FIG. 12 are utilized on the ends of lower transverse bar 60 illustrated in FIG. 9. After clamp members 90 and 90' have been mounted to bar 60, the assembly is then, in turn, mounted to the flange 196 and the clamping members 116 and 116' are tightened so as to support bar 60 thereacross. Vertical post 10 may then be placed in position as desired at the center of bar 60, and pin 42 may be placed through stabilizer pipe 68 or bar 60 until the primary pin 34 has been inserted through the proper apertures. The upper transverse bar 50 is then installed on vertical post 10 in the same manner as above described, and the remaining components may then be installed in the same general fashion as described above in connection with the embodiments illustrated in FIGS. 2 and 13.

It may be appreciated that the device of the present invention provides ease of handling and safety features heretofore unavailable. A single individual may safely and easily assemble and operate the apparatus to facilitate both the mounting and dismounting of a plurality of differently sized tires and rims. The invention is easy to operate, inexpensive, and obviates the need for complex machinery or power tools. It is very versatile and clearly finds application in the demounting process, especially in those cases where rust has accumulated between the bead seat band and the rim flange so as to require uniform large pressures for breaking down the tire. However, it should be understood that the primary use of the present invention is presently envisioned as a mounting assist tool.

Obviously, numerous modifications and variations of the present invention are possible in light of the above teachings. It is therefore to be understood that within the scope of the appended claims, the invention may be practiced otherwise than as specifically described herein.

I claim as my invention:

1. Apparatus which may be adapted for mounting an extremely large, off-highway tire onto its associated rim, which comprises:
   a first elongated rigid bar positioned within said rim transverse to the central axis thereof;
   means connected to each end of said first rigid bar for clamping same to the inner periphery of said rim;
   a second elongated rigid bar positioned above said tire and said first rigid bar;
   rigid coupling means extending vertically between and transversely with respect to said first and second rigid bars, said first rigid bar being fixed in use to the lower portion of said coupling means, said second rigid bar being fixed in use to the upper portion of said coupling means; and
   a pair of manually actuable hydraulic jacks coupled between the respective end portions of said second rigid bar and diametrically opposed portions of the sidewall of said tire for exerting a downward pressure on the latter.

2. The apparatus as set forth in claim 1, wherein said clamping means comprises a pair of rigid hollow members which include means for fixedly securing same to the ends of said first rigid bar.

3. The apparatus as set forth in claim 2, each of said rigid hollow members having wedge means for abutting the inner periphery of said rim.

4. The apparatus as set forth in claim 2, wherein each of said rigid hollow members includes means for clamping same to an inwardly extending flange on said rim.

5. Apparatus which may be adapted for mounting an extremely large, off-highway tire onto tis associated rim, which comprises:
   a first elongated rigid bar positioned transversely within and connected to the inner periphery of a rim upon which said tire is to be mounted;
   a second elongated rigid bar positioned above said tire and said first rigid bar;
   a rigid vertical bar having a pair of downwardly depending parallel flanges between which said first rigid bar is transversely rigidly secured and a pair of upwardly depending parallel flanges between which said second rigid bar is transversely rigidly secured; and
   a pair of manually actuable hydraulic jacks coupled between the respective end portions of said second rigid bar and diametrically opposed portions of the sidewall of said tire.

6. The apparatus as set forth in claim 5, wherein both of said pair of flanges each include a plurality of spaced apertures extending therethrough for adjustably accommodating the height of said first and second elongated rigid bars.

7. The apparatus as set forth in claim 6, wherein said first rigid bar includes a central aperture formed therethrough for alignment with selected apertures formed in said downwardly depending flanges.

8. The apparatus as set forth in claim 7, wherein said second rigid bar includes a central aperture formed therethrough for alignment with selected apertures formed in said upwardly extending flanges.

9. The apparatus as set forth in claim 8, further comprising two pins for respectively securing said first and second rigid bars to said rigid vertical bar, and two safety pins for insertion through safety apertures in said flanges at positions adjacent the positions of said two pins.

10. Apparatus which may be adapted for mounting an extremely large, off-highway tire onto its associated rim, which comprises:
 a first elongated rigid bar positioned transversely within and whose ends are connected to the inner periphery of said rim;
 a second elongated rigid bar positioned above said tire and said first rigid bar;
 rigid vetically elongated coupling means to the lower and upper portions of which are respectively transversely connected said first and second rigid bars;
 a plurality of rings positioned at spaced corresponding locations on the underside of each end of said second rigid bar; and
 a pair of manually actuable hydraulic jacks having vertically extendable piston means for mating within corresponding rings on said second rigid bar, the base portions of said jacks positioned over opposite sidewall portions of said tire for exerting downward pressure thereon.

11. The apparatus as set forth in claim 10, further comprising a pair of base plates positioned respectively between said pair of jacks and said opposite sidewall portions of said tire.

12. The apparatus as set forth in claim 11, wherein each of said base plates includes an arcuate edge.

13. Apparatus which may be adapted for mounting an extremely large, off-highway tire onto its associated rim, which comprises:
 a first elongated rigid bar positioned transversely within and whose ends are connected to the inner periphery of said rim;
 a second elongated rigid bar positioned above said tire and said first rigid bar;
 rigid vertically elongated coupling means to the lower and upper portions of which are respectively transversely connected said first and second rigid bars;
 a pair of mutually actuable hydraulic jacks coupled between the respective end portions of said second rigid bar and diametrically opposed portions of the sidewall of said tire; and
 plate means positioned between said jacks and said sidewall portions of said tire for transmitting pressure exerted by said jacks uniformly over said sidewall portions and including aperture means positioned in said plate means for stabilizing the position thereof over said sidewall portions.

14. The apparatus as set forth in claim 13, wherein said plate means further includes an arcuate edge for permitting placement thereof adjacent the curved outer edge of said rim.

* * * * *